(12) United States Patent
Reiman et al.

(10) Patent No.: US 6,915,611 B2
(45) Date of Patent: Jul. 12, 2005

(54) DEPLOYABLE STRUCTURE

(75) Inventors: James Reiman, Winnetka, IL (US); Peter Heppel, New York, NY (US)

(73) Assignee: Aerotail, LLC, Winnetka, IL (US)

( * ) Notice: Subject to any disclaimer, the term of this patent is extended or adjusted under 35 U.S.C. 154(b) by 14 days.

(21) Appl. No.: 10/323,693

(22) Filed: Dec. 19, 2002

(65) Prior Publication Data

US 2004/0118055 A1 Jun. 24, 2004

(51) Int. Cl.⁷ ............................ E04B 7/346; E04B 7/16
(52) U.S. Cl. ........................................ 52/64; 296/180.1
(58) Field of Search ........................... 296/180.1, 180.4, 296/180.5; 52/64, 69, 71

(56) References Cited

U.S. PATENT DOCUMENTS

| | | | |
|---|---|---|---|
| 2,737,411 A | 3/1956 | Potter | |
| 2,982,290 A | 5/1961 | Hunziker | 135/1 |
| 3,206,100 A | 9/1965 | Wenger | 229/44 |
| 3,371,453 A | 3/1968 | Groskopfs et al. | 52/108 |
| 3,533,202 A | 10/1970 | Gellert | 52/80 |
| 3,534,514 A | 10/1970 | Gellert | 52/80 |
| 3,657,753 A | 4/1972 | Le Blanc, Sr. | 9/310 F |

(Continued)

FOREIGN PATENT DOCUMENTS

DE          3817497        * 12/1988

*Primary Examiner*—Ramón O. Ramirez
*Assistant Examiner*—Amy J. Sterling
(74) *Attorney, Agent, or Firm*—Fitzpatrick, Cella, Harper & Scinto

(57) ABSTRACT

A structure having a first semi-rigid surface with a first curved edge, the first semi-rigid surface adapted to be rotatably secured to a reference to permit the first semi-rigid surface to assume a first position and a second position, and a first joint structure spanning the first semi-rigid surface to permit the first semi-rigid surface to be folded when in the first position and unfolded when in the second position. The structure includes a second semi-rigid surface having a second curved edge, the second semi-rigid surface adapted to be rotatably secured to the reference to permit the second semi-rigid surface to assume a first position and a second position. The first and second semi-rigid surfaces are joined together at their first and second curved edges by a second joint structure adapted to permit the first and second semi-rigid surfaces to fold approximately together when the first and second semi-rigid surfaces are in their first positions.

2 Claims, 4 Drawing Sheets

U.S. PATENT DOCUMENTS

| | | | |
|---|---|---|---|
| 3,721,027 A | 3/1973 | Slavsky | 40/10 R |
| 3,751,615 A | 8/1973 | De Loisy | 200/86 R |
| 3,774,309 A | 11/1973 | Leopoldi | 33/138 |
| 4,006,932 A | 2/1977 | McDonald | |
| 4,030,779 A | 6/1977 | Johnson | |
| 4,036,519 A | 7/1977 | Servais et al. | |
| 4,088,362 A | 5/1978 | Mollura | |
| 4,142,755 A | 3/1979 | Keedy | |
| 4,145,850 A * | 3/1979 | Runyon | 52/71 |
| 4,153,288 A | 5/1979 | Mueller | |
| 4,257,641 A * | 3/1981 | Keedy | 296/180.4 |
| 4,419,994 A | 12/1983 | Hilton | 128/206.19 |
| 4,424,929 A * | 1/1984 | Weis | 227/32 |
| 4,451,074 A | 5/1984 | Scanlon | |
| 4,458,936 A | 7/1984 | Mulholland | |
| 4,601,508 A | 7/1986 | Kerian | |
| 4,688,841 A | 8/1987 | Moore | |
| 4,702,509 A | 10/1987 | Elliott, Sr | |
| 4,741,569 A | 5/1988 | Sutphen | |
| 4,818,015 A | 4/1989 | Scanlon | 296/180.1 |
| 4,978,162 A | 12/1990 | Labbé | 296/180.2 |
| 5,058,945 A | 10/1991 | Elliott, Sr. et al. | 296/180.5 |
| 5,240,306 A | 8/1993 | Flemming | 296/180.4 |
| 5,355,555 A * | 10/1994 | Zarelius | 16/225 |
| 5,375,903 A | 12/1994 | Lechner | 296/180.1 |
| 5,498,059 A | 3/1996 | Switlik | 296/180.1 |
| 5,685,597 A | 11/1997 | Reid | 296/180.1 |
| 5,823,610 A | 10/1998 | Ryan et al. | 296/180.4 |
| 5,947,548 A | 9/1999 | Carper et al. | 296/180.1 |
| 6,082,385 A * | 7/2000 | Burford et al. | 135/116 |
| 6,092,861 A | 7/2000 | Whelan | 296/180.2 |
| 6,126,239 A * | 10/2000 | Hazzard | 297/440.1 |
| 6,309,010 B1 | 10/2001 | Whitten | 296/180.4 |
| 6,343,441 B1 | 2/2002 | Merz et al. | 52/66 |
| 6,428,084 B1 * | 8/2002 | Liss | 296/180.3 |
| 6,467,833 B1 | 10/2002 | Travers | 296/180.4 |
| 6,485,087 B1 * | 11/2002 | Roberge et al. | 296/180.5 |
| 2003/0131539 A1 * | 7/2003 | Burford et al. | 52/64 |

* cited by examiner

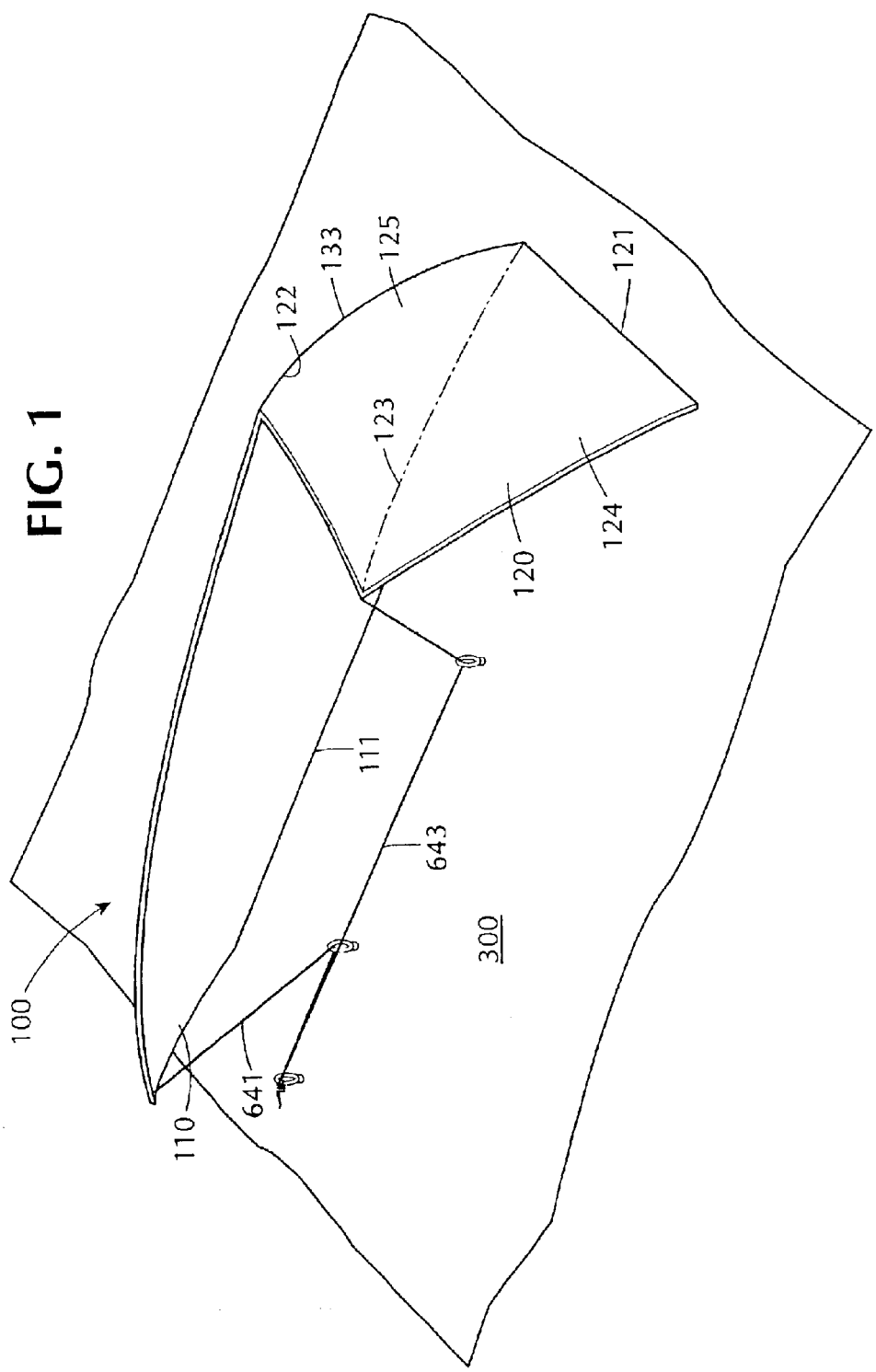

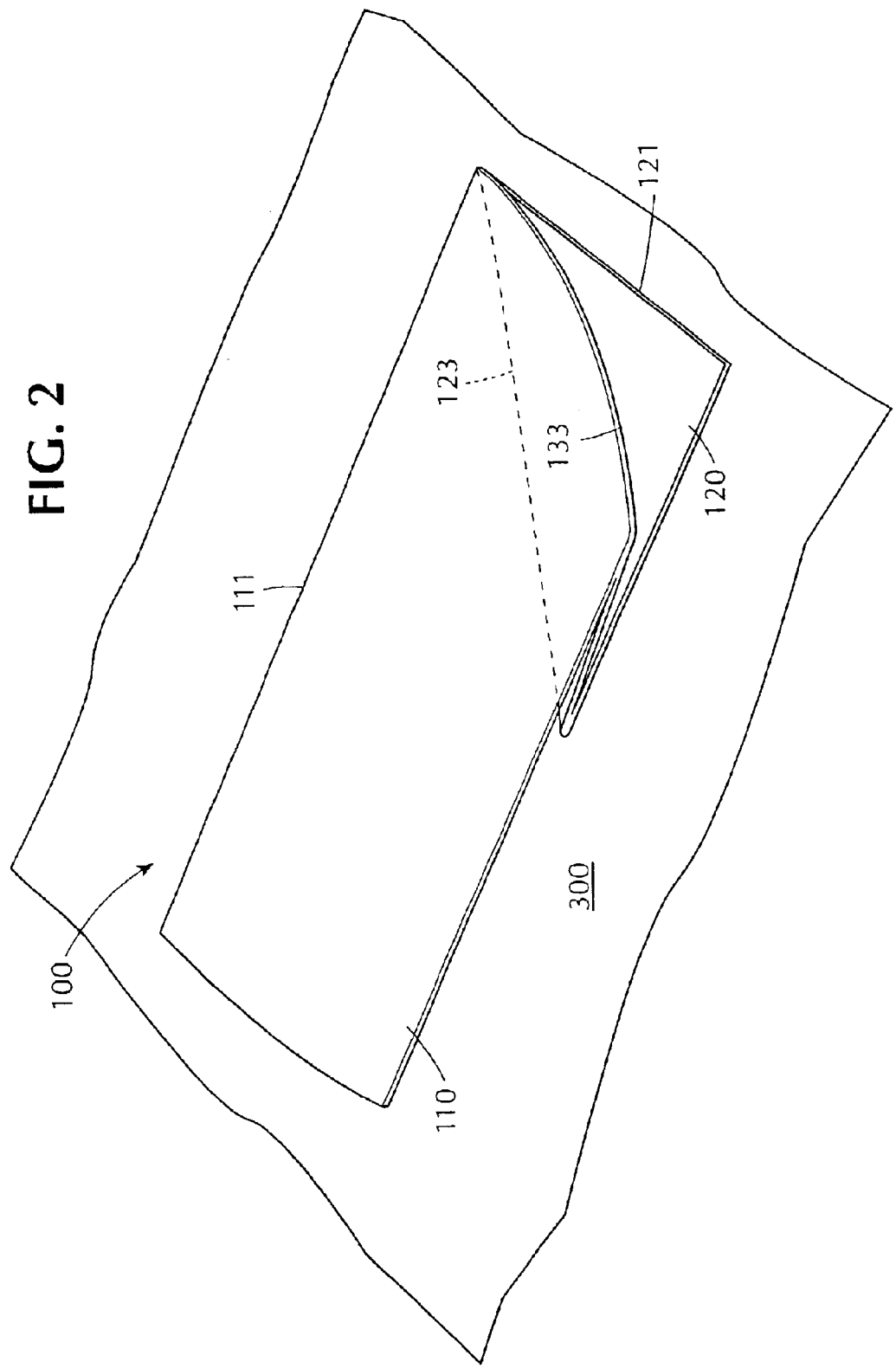

US 6,915,611 B2

DEPLOYABLE STRUCTURE

BACKGROUND OF THE INVENTION

This invention relates to a deployable structure that is easily opened for use, yet folds into a compact shape.

SUMMARY OF THE INVENTION

The present invention is a deployable structure that comprises a first semi-rigid surface having a curved edge, with the first semi-rigid surface secured to a reference (defined below) in a manner that permits the first semi-rigid surface to assume two positions: a first position adjacent the reference, and a second position extended from the reference. There is further provided a first joint structure which spans the first semi-rigid surface, to permit the first semi-rigid surface to be folded when in the first position and unfolded when in the second position. As described in more detail below, this first semi-rigid surface advantageously acts as a single panel when fully deployed, while converting to two panels to facilitate retraction and storage.

The structure also includes a second semi-rigid surface having a curved edge, with the second semi-rigid surface secured to the reference in a manner that permits the second semi-rigid surface to assume a first position adjacent the reference and a second position extended from the reference. The first and second semi-rigid surfaces are joined together at their first and second curved edges by a second joint structure adapted to permit the first and second semi-rigid surfaces to fold approximately together when the first and second semi-rigid surfaces are adjacent the reference.

These and other aspects of the invention disclosed herein have a wide variety of uses, such as for temporary buildings or structures; for medical devices (e.g., inside veins and orthorscopic work—a device which can be packed small and be flexible, and then expanded into a strong, rigid structure once through a narrow entry); for various other devices (again, for use where there is a small access point and the need for a strong, larger structure once access is gained); for construction of foundations (narrow support column, with a wide underground footing); for deployable and stowable aero dynamic drag reducing fairings (such as for truck boxes and containers); and the like.

BRIEF DESCRIPTION OF THE DRAWINGS

FIG. 1 depicts a schematic perspective view of an exemplary embodiment of the present invention, with the invention in the fully deployed position.

FIG. 2 depicts a schematic perspective view of an exemplary embodiment of the present invention, with the invention in the fully stowed position.

DETAILED DESCRIPTION OF THE INVENTION

Figure 3A:
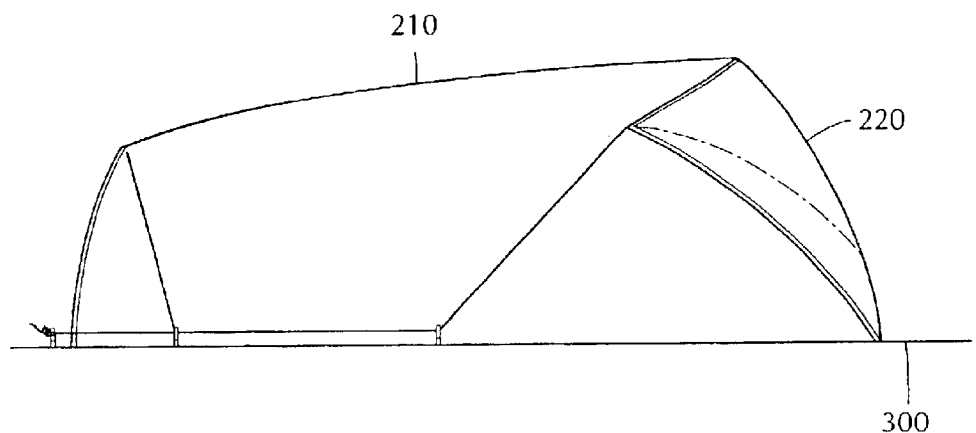
FIG. 3A depicts a side elevational view of an exemplary embodiment of the present invention, with the invention in the fully deployed position.
Figure 3B:
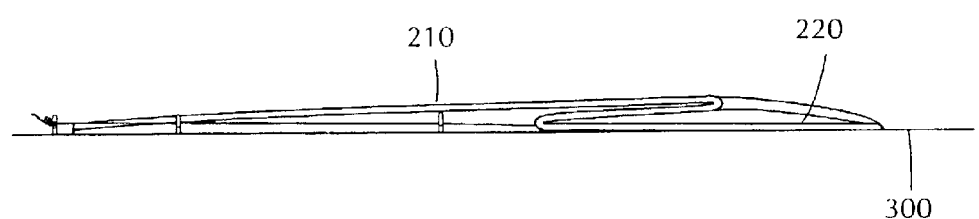
FIG. 3B depicts a side elevational view of an exemplary embodiment of the present invention, with the invention in the fully stowed position.
Figure 4:
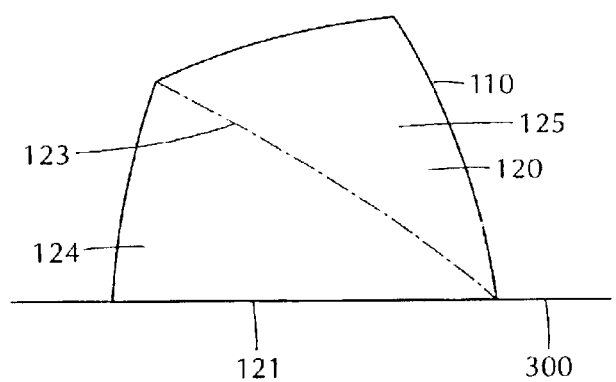
FIG. 4 depicts a top view of an exemplary embodiment of the present invention, with the invention in the fully deployed position.

In this disclosure, the term "reference" in its broadest sense means three non-colinear spatial points that define a geometrical plane (which may or may not have a physical counterpart) to which the present invention, assembly 100, can be secured. For example, the physical counterpart for the reference can be the side, rear, front, top, bottom, beginning or end of an object, a portion of the surface of an object, two pipes joined by a right angle bend (the plane that they define being the reference), the earth's surface, the blunt end of an instrument or tool, three vertically-placed rods or poles (the plane defined by their three ends being the reference), and so on, depending upon the specific application or use to which the present invention is put.

Referring to FIGS. 1 and 2, assembly 100 includes two principal components, a first surface 120 and a second surface 110. When folded or stowed, surfaces 110 and 120 are generally planar in geometry, although as described below they each assume a curvature when deployed. The first surface 120 and second surface 110 are each semi-rigid in construction. In this disclosure, a surface or panel is semi-rigid when it is of such thickness and material properties that, when flat, its bending stiffness and strength are low enough to permit the panel to bend elastically, without permanent deformation, to a radius of the same order of magnitude as the panel's width or height, and yet, when so bent elastically, the panel has sufficient resistance to buckling to enable it to resist load as a shell structure. Since the bending is elastic, the surface will re-assume a planar geometry upon ending the application of the external force used to create the bending. This semi-rigid construction can be achieved by forming each of first surface 120 and second surface 110 from a sheet of material such as sheet polypropylene.

First surface 120 includes a terminal portion 121 that is depicted as a linear edge of surface 120, although it is not essential to this invention that portion 121 be linear. First surface 120 is secured to the reference 300 (in this case at terminal portion 121) in a manner which permits surface 120 to rotate approximately about the axis defined by the intersection of first surface 120 and reference 300. The terminal portion 121 of first surface 120 is secured to the reference 300 by any suitable feature or mechanism that will accord it the aforementioned rotational degree of freedom, such as by mechanical hinges. However, it should be understood that any feature or mechanism permitting such a rotational degree of freedom is suitable for use in the present invention, and that such a feature or mechanism need not be secured to terminal portion 121.

Likewise, second surface 110 includes a terminal portion 111 that is depicted as a linear edge of surface 110, although it is not essential to this invention that portion 111 be linear. Second surface 110 is secured to the reference 300 (in this case at terminal portion 111) in a manner which permits surface 110 to rotate approximately about the axis defined by the intersection of second surface 110 and reference 300. As was the case with first surface 120, the terminal portion 111 of second surface 110 is secured to the reference 300 by any suitable mechanism that will accord it the aforementioned rotational degree of freedom, such as by mechanical hinges. However, it should be understood that any mechanism permitting such a rotational degree of freedom is suitable for use in the present invention, and that such a mechanism need not be secured to terminal portion 111.

Figure 5B:
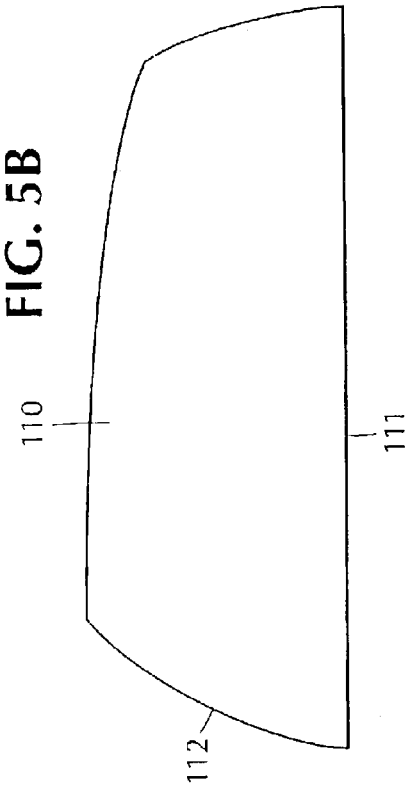
FIGS. 5A and 5B depict plan views of exemplary embodiments of second surface 110 and first surface 120 in unassembled form.
Figure 5A:
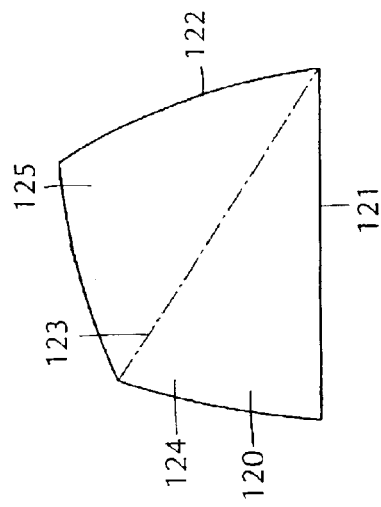

Referring to FIG. 5A, first surface 120 has a joint structure 123 spanning first surface 120 from the intersection of terminal portion 121 and curved edge 122 to, in this case, the diagonally opposite corner of first surface 120. The purpose of joint structure 123 is to allow the two parts of surface 120, specifically center panel 124 and side panel 125, to fold together when assembly 100 is stowed. Accordingly, while shown in FIG. 5A to span surface 120 diagonally, orientation of joint structure 123 is preferably in accordance with the orientation that will most easily permit panels 124, 125 of first surface 120 to fold together and against second surface 110 in a compact manner without significantly stressing or bending the components, or requiring undue force to hold the folded assembly together. Joint structure 123 allows rotation of panels 124, 125 relative to each other, while also permitting bending of the joint structure 123 as such rotation proceeds. While depicted as linear, joint structure 123 optionally can be curved, as a means for imparting more shape.

Figure 6:
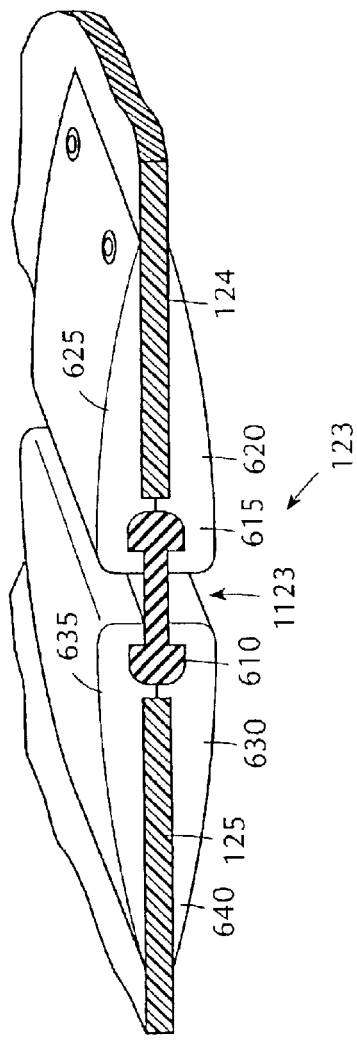
FIG. 6 depicts an exemplary mechanism for the joinder of panel 124 with panel 125.

A joint structure mechanism suitable for joint structure 123 is depicted in FIG. 6. In FIG. 6, one end of an elastomeric member 1123, made for example of rubber, is clamped between parts 620, 625 of securing member 615, and the other end of elastomeric member 1123 is clamped between parts 635, 640 of securing member 630. Securing members 615 and 630, which can be formed of molded polypropylene or other suitable material, are in turn respectively joined to parts 124 and 125 in any suitable manner, such as by rivets, welds, nuts and bolts, or the like. Elastomeric member 1123 or securing members 615 and 630 (or all) can be continuous in length, or interrupted, as is preferred. Alternatively, joint structure 123 can be a series of interrupted hinges spaced along the length of the intersection of panels 124, 125, as well as other mechanisms providing a similar function.

As depicted in FIGS. 5A and 5B, second surface 110 has a curved edge 112 and first surface 120 has a curved edge 122. When the assembly 100 is assembled, edges 112 and 122 are joined along their lengths by a joint structure 133 that allows rotation of surface 120 relative to surface 110 about the intersection of edges 112, 122, while also permitting bending of the joint structure 133 as such rotation proceeds. The joint structure 133 can be as depicted in FIG. 6. Alternatively, joint structure 133 can be a series of interrupted hinges along the length of the intersection of curves 112, 122, as well as other mechanisms providing a similar function.

The deployment of assembly 100 proceeds as follows, starting from the condition where assembly 100 is in a folded state. More particularly, first surface 120 is positioned adjacent to the reference 300, and the upper portion of second surface 110 is positioned adjacent to the first surface 120. The two panels 124, 125 are in a folded state, with panel 124 sandwiched between panel 125 and the reference 300, and panel 125 sandwiched between second surface 110 and panel 124.

Deployment commences by simply rotating second surface 110 out away from the reference 300, as a result of which first surface 120 starts to deploy. As this operation proceeds, the internal angle between surface 110 and panel 125 starts to open up, which in turn causes the region of surface 120 proximate to curved edge 122 to be urged into a downwardly curved shape, in seeking to conform to the curvature of curved edge 112. Likewise, the region of second surface 110 proximate to curved edge 112 is urged into a curved shape, in seeking to conform to the curvature of curved edge 122.

To complete deployment, a force or torque is applied to first surface 120 in a manner causing first surface 120 to elastically buckle outward along the length of joint structure 123, with the result that panels 124, 125 are made locally co-planar in the region of joint structure 123, while the buckling action causes surface 120 to assume a curved shape. For example, by utilizing structures or systems appropriate to the application, a force may be applied in the region of the anti-node of the primary buckling mode of first surface 120, in a direction generally normal to the plane of surface 120. The result of surface 120 buckling outward is to "lock" joint structure 123 in the open position, until another force is applied to cause structure 123 to buckle back into its original shape, thus freeing up joint structure 123 to rotate.

The rigidity of fairing assembly 100 can be enhanced by tensioning inward the free edges of second surface 110 and first surface 120 during or subsequent to their deployment. For example, there is shown in FIG. 1 an exemplary tensioning mechanism, a set of two cables 641 and 643, which are used to provide the requisite tensioning. These cables 641 and 643 can be tensioned after deployment of assembly 100.

Alternatively, the tensioning mechanism can be designed to cause tensioning in a passive manner, such that deployment of the surfaces 110, 120 by itself causes the tensioning mechanism to operate and, in turn, bend the surfaces in an appropriate manner. For example, tensioning of cables 641 and 643 can be accomplished by securing them to reference 300 at an appropriate length. By doing so, cables 641 and 643 assume a tensioned state after partial deployment of surfaces 110, 120, and further deployment of the surfaces to a fully deployed state causes the fairing surfaces to bend to an appropriate degree. A similar passive tensioning function can be achieved by using other suitable tensioning mechanism designs, such as designs employing rods, levers, etc., as the primary elements, depending upon the particular application, as would be evident to a person of ordinary skill in the art.

In addition, deployment and folding of surfaces 120 and 110 can be accomplished either manually, or using deployment/stowage mechanisms. Examples of deployment/stowage mechanisms are set forth in application Ser. No. 10/323,700, filed on the same date as the present application, naming the same inventors as herein and entitled "Deployable Vehicle Fairing Structure" the contents of which are incorporated by reference herein. The tensioning and deployment/stowage functions can be accomplished using a single mechanism, as more fully described in the foregoing application Ser. No. 10/323,700, filed on the same date as the present application, naming the same inventors as herein and entitled "Deployable Vehicle Fairing Structure" whose contents are incorporated by reference herein.

While only some of the present embodiments are described above, it is obvious that several modifications are possible without departing from the spirit of the present invention. It is also further understood that various further changes and modifications can be made without departing from the spirit and scope of the invention.

What is claimed is:

1. A deployable structure, comprising:
   a first semi-rigid surface a first edge, a second edge and a third generally non-linear edge joining the first and second edges, the chord line of the third generally non-linear edge forming less than a right angle with the first edge, the first semi-rigid surface for being rotatably secured to a reference at the first edge to permit the first semi-rigid surface to assume a first position and a second position, and the first semi-rigid surface comprising two joined panels to permit the first semi-rigid surface to be folded when in the first position and unfolded when in the second position;

a second semi-rigid surface having a fourth edge, a fifth edge and a sixth generally non-linear edge joining the fourth and fifth edges, the chord line of the sixth generally non-linear edge forming less than a right angle with the fourth edge, the second semi-rigid surface for being rotatably secured to the reference at the fourth edge to permit the second semi-rigid surface to assume a first position and a second position; and the first and second semi-rigid surfaces joined together at their third and sixth generally non-linear edges directly between the surfaces, to permit the first and second semi-rigid surfaces to fold approximately together when the first and second semi-rigid surfaces are in their first positions.

2. The structure as in claim 1, further comprising a tensioning mechanism secured to the first semi-rigid surface and the second semi-rigid surface, and for being secured to the reference.

* * * * *